(12) United States Patent
Duerksen et al.

(10) Patent No.: US 8,195,346 B1
(45) Date of Patent: Jun. 5, 2012

(54) ENVELOPE PROTECTION FOR MECHANICALLY-CONTROLLED AIRCRAFT

(75) Inventors: Noel J. Duerksen, De Soto, KS (US); John C. Johnson, Olathe, KS (US); Justin S. Williams, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 691 days.

(21) Appl. No.: 12/356,936

(22) Filed: Jan. 21, 2009

(51) Int. Cl.
*G06F 7/00* (2006.01)
(52) U.S. Cl. .......................................................... 701/15
(58) Field of Classification Search .......... 701/3, 13–15; 244/75 R, 158 R
See application file for complete search history.

(56) References Cited

U.S. PATENT DOCUMENTS

| | | | | |
|---|---|---|---|---|
| 6,169,496 | B1 * | 1/2001 | Martin et al. | 340/966 |
| 6,493,609 | B2 * | 12/2002 | Johnson | 701/3 |
| 6,695,264 | B2 * | 2/2004 | Schaeffer et al. | 244/223 |
| 6,735,500 | B2 * | 5/2004 | Nicholas et al. | 701/3 |
| 7,108,232 | B2 | 9/2006 | Hoh | 244/223 |
| 2007/0267548 | A1 | 11/2007 | Ciholas et al. | 244/223 |

OTHER PUBLICATIONS

Steck, James E. et al.; Simulation and Flight Test Assessment of Safety Benefits and Certification Aspects of Advanced Flight Control Systems; Wichita State University; Raytheon Aircraft Company; p. 4, Dec. 2002.
Steck, James E. et al.; Simulation and Flight Test Assessment of Safety Benefits and Certification Aspects of Advanced Flight Control Systems Addendum 1; Wichita State University Raytheon Aircraft Company; p. 2, Dec. 2003.
Steck, James E. et al.; Adaptive Neural Network Inverse Controller for General Aviation Safety; Wichita State University Raytheon Aircraft Company; p. 5, Dec. 2003.
Agarwal, Ramesh, et al.; Simulation and Flight Test Assessment of Safety Benefits and Certification Aspects of Advanced Flight Control Systems; National Institute for Aviation Research, Wichita State University; pp. 5 and 19., May 7, 2002.
Stewart, E.C.; A piloted Simulation Study of Advanced Controls and Displays for Novice General Aviation Pilots; NASA Langley Research Center; p. 4; Jan. 1994.
Duerksen, Noel; Advanced Flight Controls and Pilot Displays for General Aviation; Raytheon Aircraft Company; p. 3; Published prior to Jan. 21, 2008.
Airbus Flight Control Laws from the website http://www.airbusdriver.net/airbus_fltlaws.htm ; published prior to Jan. 21, 2009.
Discussion of Boeing and Airbus Envelope Protection from the website http://www.airliners.net/aviation-forum/tech_ops/read.main/154589; May 2006.

* cited by examiner

*Primary Examiner* — Yonel Beaulieu
(74) *Attorney, Agent, or Firm* — Samuel M. Korte

(57) ABSTRACT

An avionics system for a mechanically-controlled aircraft configured to provide envelope protection for deterring a pilot from flying outside of acceptable flight parameter limits for flight parameters such as banking angle, pitch attitude, g loading, proximity to terrain and/or obstacles, angle of attack, and/or airspeed. The avionics system may comprise at least one servo actuator and a computing device. The computing device may engage envelope protection by engaging the at least one servo actuator if the aircraft reaches a maximum or minimum limit for any of the flight parameters, such that the at least one servo actuator provides a force to urge a flight control device in a direction to bring the aircraft back within the acceptable flight parameter limits. The servo actuator may be disengaged when the aircraft flight parameters reach an end value corresponding to the start value that triggered envelope protection to engage.

21 Claims, 1 Drawing Sheet

ENVELOPE PROTECTION FOR MECHANICALLY-CONTROLLED AIRCRAFT

BACKGROUND

1. Field

Embodiments of the present invention relate to avionics systems for mechanically-controlled aircraft that are configured to provide envelope protection for deterring a pilot from flying outside of acceptable flight parameter limits.

2. Related Art

All aircraft have limits on acceptable airspeed, pitch attitude, and banking angles. In some fly-by-wire controlled aircrafts, envelope protection is employed to prevent or deter a pilot from exceeding acceptable limits.

For example, Airbus has an envelope protection system employed on its fly-by-wire controlled aircrafts that provides absolute limits for airspeed, pitch attitude, and banking angles. Once a limit is reached, the envelope protection system doesn't allow the aircraft to exceed it, regardless of contrary instructions by a pilot. For the purposes of envelope protection, the airplane motion is limited through electronic control of the aerodynamic surfaces of the aircraft, independent of how far beyond that limit the pilot can physically move the yoke or control column.

A Boeing envelope protection system employed on its fly-by-wire controlled aircrafts provides a "soft barrier" at its outer limits, meaning that when the limit is reached, simulated opposing force is provided as feedback to the pilot, but the pilot can override the protections by pushing or pulling harder or clicking an override button. The Boeing fly-by-wire controlled aircrafts feature artificially generated forces for the pilot to simulate the feel of a mechanically-controlled aircraft, so the simulated opposing forces for envelope protection can be accomplished by simply modifying those artificial forces.

The envelope protection systems employed for fly-by-wire controlled aircraft are unsuited for mechanically-controlled aircrafts, because the control column or yoke of a mechanically-controlled aircraft is mechanically linked to the control surfaces of the aircraft and can not move independently of these control surfaces. Since fly-by-wire systems can actuate control surfaces independent of pilot force generation on the control column, the response applied to the control column and the corresponding response applied to the control surfaces may be modified or independently set as required for particular envelope protection limits. This is not possible on a mechanically-controlled aircraft.

SUMMARY

In various embodiments, an avionics system for a mechanically-controlled aircraft is configured to provide envelope protection for deterring a pilot from flying outside of acceptable flight parameter limits. The avionics system may generally comprise at least one servo actuator and a computing device. The at least one servo actuator is connected with a flight control device of the aircraft such that the servo actuator provides force to the flight control device when engaged. The computing device is configured to receive flight parameters from one or more flight sensors and engage envelope protection by engaging the at least one servo actuator if any of the flight parameters received reach or exceed any of the acceptable flight parameter limits, such that the at least one servo actuator provides a force to urge the flight control device in a direction to bring the aircraft back within the acceptable flight parameter limits.

BRIEF DESCRIPTION OF THE DRAWINGS

Embodiments of the present invention are described in detail below with reference to the attached drawing figures, wherein.

Figure 1:
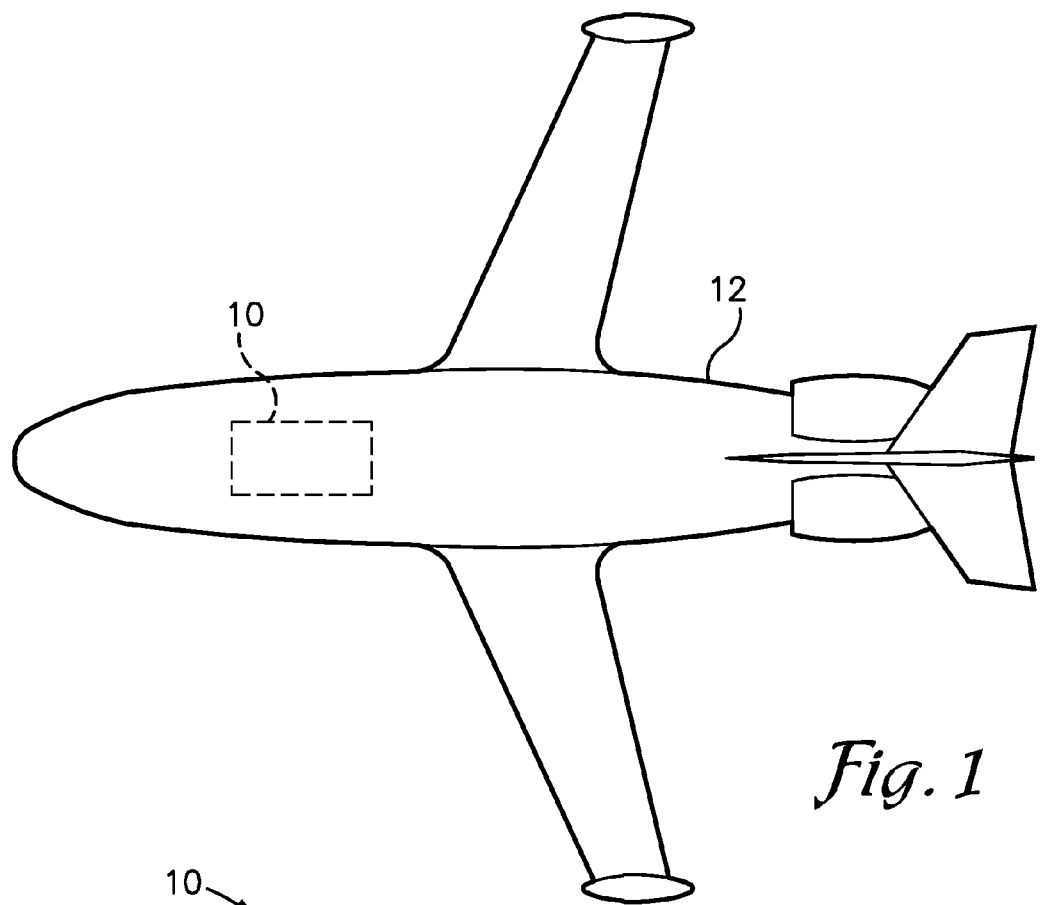
FIG. 1 is a schematic view of an aircraft in which an avionics system constructed in accordance with an embodiment of the present invention is used.

The drawing figure does not limit embodiments of the invention to the specific embodiments disclosed and described herein. The drawings are not necessarily to scale, emphasis instead being placed upon clearly illustrating the principles of the various embodiments of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FIG. 1 illustrates an avionics system 10 for use in an aircraft 12 for deterring a pilot from exceeding envelope protection limits on banking, pitch attitude, g loading, proximity to terrain or obstacles, angle of attack, airspeed of the aircraft 12, or any other flight parameter. The aircraft 12 may be any mechanically-controlled aircraft such as a Cessna 172, Cessna Citation, Beech Bonanza, Hawker 800, and the like. An "envelope" is defined herein as a range of a flight parameter where ideal operation occurs. The flight parameter may be an aircraft attitude, airspeed, structural load, proximity to terrain or obstacles, system state (e.g. engine temperature), or any other parameter on an aircraft or combination of parameters that can be measured and can be used to inform operation. Thus, "flight parameter" as used herein may include engine and aircraft parameters, such as engine temperature, terrain parameters, systems parameters such as hydraulic pressure, environmental parameters such as cabin pressure or cabin temperature, combinations thereof, and the like. Envelope protection is applied by the avionics system 10 if the aircraft's flight is outside of this envelope for one or more monitored flight parameters.

The avionics system 10 and method may be implemented in hardware, software, firmware, or a combination thereof. In various embodiments, the invention is implemented with an assisted flight computer program integrated into an avionics system such as the G1000® integrated avionics system provided by Garmin® International, Inc. The avionics system 10 and computer programs illustrated and described herein are merely examples of computer equipment and programs that may be used to implement the present invention and may be replaced with or supplemented with other avionics equipment and computer programs without departing from the scope of the present invention.

It should be noted that the features of the present invention may be incorporated into any components of the avionics system 10. For example, the features could be implemented in the G1000® itself, a separate autopilot controller, and/or any other avionics suite component. The features may also be distributed among the components of the avionics system 10. Finally, the features may be implemented in a stand-alone device, which is then interfaced to a more traditional avionics suite. Thus, while certain features are described as residing in the computing device, the features may be implemented elsewhere.

Figure 2:
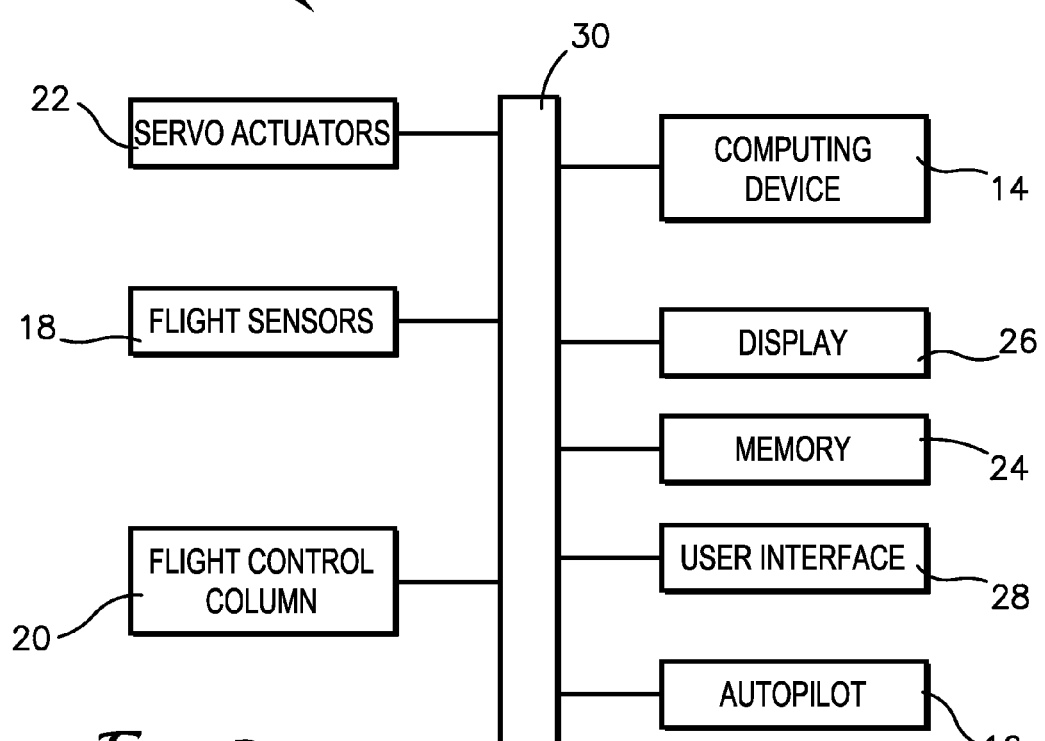
FIG. 2 is a schematic view of an exemplary embodiment of the avionics system.

FIG. 2 illustrates the avionics system 10, which may include, among other components, at least one computing device 14, an autopilot system 16, one or more flight sensors 18, and a flight control device 20. Additionally, the avionics system 10 may comprise one or more servo actuators 22 configured to provide opposing force to the pilot through the flight control device 20 if the pilot attempts to fly outside of the envelope protection limits. The computing device 14 may include any number of processors, controllers, integrated circuits, programmable logic devices, or other computing devices and resident or external memory for storing data and other information accessed and/or generated by the avionics system 10. The avionics system 10 and the autopilot system 16 may be at least partially implemented on the computing device 14. The computing device 14 may be coupled with the flight sensors 18, the servo actuators 22, a memory 24, at least one display 26, a user interface 28, and other components through wired or wireless connections, such as a data bus 30, to enable information to be exchanged between the various components. Note that the present invention may be incorporated in an aircraft that otherwise may not have an avionics system. In this case, embodiments of the present invention constitute the avionics system 10 in and of itself.

The computing device 14 may implement a computer program and/or code segments to perform the functions and method described herein. The computer program may comprise an ordered listing of executable instructions for implementing logical functions in the computing device 14. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, device or propagation medium. More specific, although not inclusive, examples of the computer-readable medium would include the following: a portable computer diskette, a random access memory (RAM), a read-only memory (ROM), an erasable, programmable, read-only memory (EPROM or flash memory), and a portable compact disk read-only memory (CDROM).

The memory 24, may be integral with the computing device 14, stand-alone memory, or a combination of both. The memory may include, for example, removable and non-removable memory elements such as RAM, ROM, flash, magnetic, optical, USB memory devices, and/or other conventional memory elements.

The memory 24 may store various data associated with the operation of the aircraft 12, such as the computer program and code segments mentioned above, or other data for instructing the computing device 14 and system elements to perform the steps described herein. Furthermore, the memory 24 may store, for example, the ATIS, clearance, ground and tower frequencies for all known airports; stored waypoints and other navigation information; pre-flight, pre-landing, and pre-taxi checklists and other check lists; stored flight plans; general information about the aircraft and airports used by the aircraft; topographic data; obstacle locations and heights; terrain elevation data; airplane configuration settings; pilot profiles; arrival procedures; departure procedures; approach procedures; airport diagrams; runway and taxiway data; weather frequencies; user-defined waypoints; VORs; NDBs; and intersections, airways, and airspace boundaries. The various data stored within the memory 24 may also be associated within one or more databases to facilitate retrieval of the information.

The display 26 may comprise conventional black and white, monochrome, or color display elements including CRT, TFT, LCD, and/or LED display devices. The display 26 may be integrated with the user interface 28, such as in embodiments where the display 26 is a touch-screen display to enable the user to interact with it by touching or pointing at display areas to provide information to the avionics system 10. The display 26 may be coupled with the computing device 14 and may be operable to display various information corresponding to the aircraft 12 and its avionics system 10, such as data from the sensors 18 as described below. For example, the display may indicate whether or not envelope protection is available, pitch and roll start values, and other symbology indicating various envelope protection limits. When envelope protection is not available, the display 26 may revert to symbology that does not indicate the envelope protection limits and display a message indicating the envelope protection is not available. Additionally, when the envelope protection limit or start value for any of the flight parameters is a pre-set value away from the corresponding current flight parameter, that flight parameter may not be indicated on the display 26. For example, if the envelope protection pitch limit is more than 7.5 degrees away from a current attitude, the display 26 may not indicate the envelope protection pitch limit. The display 26 may or may not be present in any embodiment of the invention.

The user interface 28 enables pilots, or other users, to share information with the avionics system 10. The user interface 28 may comprise one or more functionable inputs such as buttons, switches, scroll wheels, a touch screen associated with the display 26, voice recognition elements such as a microphone, pointing devices such as mice, touchpads, tracking balls, styluses, a camera such as a digital or film still or video camera, combinations thereof, etc. For example, the user interface 28 may comprise a control wheel steering (CWS) button for temporarily disengaging envelope protection, as well as an autopilot disconnect (AP DISC) button for turning off all automated systems. Further, the user interface 28 may comprise wired or wireless data transfer elements such as a removable memory including the memory 24, data transceivers, etc., to enable the user and other devices or parties to remotely interface with the avionics system 10. The user interface 28 may also include a speaker for providing audible instructions and feedback.

The user interface 28 may be operable to provide various information to the user utilizing the display 26 or other visual or audio elements such as a speaker. Thus, the user interface 28 enables the user and avionics system 10 to exchange information relating to the avionics system 10, including any of the following envelope protection parameters: torque ramp-up time once a particular limit is reached; start and end roll attitudes; start roll torque; start roll rate limit; start and end maximum pitch attitude; start and end minimum pitch attitude; start and end max airspeed; use of an underspeed protection value for start maximum airspeed and a delta from the start maximum airspeed for the end maximum airspeed; start and end maximum Mach; start minimum airspeed for various flaps individually; end minimum airspeed delta from start; start and end angle of attack; start and end maximum g; start and end minimum g; start pitch torque; start maximum and minimum pitch g limit, etc. The flight parameters utilized by embodiments of the present invention may include any combination of other flight parameters, calculations based on one or more other flight parameters, combinations thereof, and the like.

Note that a "start" value refers generally to a limit of the envelope protection. When one of the "start" values, such as start maximum pitch attitude, is reached by the aircraft 12, the servo actuator 22 may apply a force to the control device 20 until the aircraft returns to a desired "end" value, such as the end maximum pitch attitude. The end maximum pitch attitude, for example, may be a value well within acceptable pitch attitude limits. The computing device 14 may store or calculate a maximum and a minimum start value for each flight parameter and a corresponding maximum and minimum end value for each start value.

The user interface 28 may or may not be used in any particular embodiment of the invention. If the system 10 is designed to accept pilot input and communicate to the pilot in ways other than providing force to the flight control device 20, then the interface 28 may be used. If pilot input is not accepted and system communications to the pilot other than force(s) on the flight control device 20 are not included, then the interface 28 may not be a part of the system 10.

The autopilot system 16 may be any autopilot system known in the art, such as GFC 700 autopilot with or without VNAV provided by Garmin® International, Inc, or the avionics system may interface with an external autopilot system. The autopilot system 16 may be at least partially implemented in the computing device 14. Elements of the autopilot system 16 and data provided by the autopilot system 16 may be used by the avionics system 10 and/or computing device 14 to determine when envelope protection is available and when envelope protection should be engaged. In various embodiments of the invention, the avionics system 10 may determine that envelope protection is available when autopilot is available but not engaged and the aircraft 12 is a predetermined height above ground. This and other uses of the autopilot system 16 are described in greater detail below.

Any particular embodiment of the system 10 may or may not include the autopilot system 16. The system 10 may be completely contained within the autopilot system 16. The avionics system 10 may exist without the autopilot system 16. Additionally, the system 10 may exist partially within the autopilot system 16 with one or more functions residing within the autopilot system 16 and one or more functions residing outside of the autopilot system 16. The autopilot system 16 and the servo actuators 22 may also provide conventional autopilot functionalities known in the art. For example, the servo actuators 22 may include a yaw servo, a pitch servo, and a roll servo for controlling the aircraft 12 in a manner desired by the autopilot system 16.

The flight sensors 18 may include various devices which sense the state of certain aspects of the aircraft 12. These sensors 18 may comprise an attitude heading and reference system (AHRS), a gyroscope, a compass, a GPS receiver, etc. However, the flight sensors 18 may be any flight sensors known in the art and may measure a variety of flight conditions. For example, the sensors 18 may indicate bank angle, pitch attitude, G loading, an altitude of the aircraft 12, an airspeed of the aircraft 12, a flight plane for the aircraft 12, fuel level, a wind speed experienced by the aircraft 12, a wind direction experienced by the aircraft 12, a temperature experienced by the aircraft 12, a weather condition experienced or predicted to be experienced by the aircraft 12, an engine temperature experienced by the aircraft, a structural load experienced by the aircraft, combinations thereof, and the like.

The flight control device 20 may be any flight control device known in the art for flight control of a mechanically controlled, non-fly-by-wire aircraft. For example, the flight control device 20 may be a yoke, a stick, a control column, a control wheel, a sidestick controller, a throttle lever, a throttle knob, a throttle wheel, a trim wheel, or any other device that is mechanically connected to a control mechanism of the aircraft 12. The control device 20 may be connected directly to any of a plurality of control surfaces engine controls, or system controls for mechanically actuating various aircraft components and to the servo actuators 22 for providing a force to deter the pilot from exceeding envelope protection limits.

The servo actuators 22 may provide force to the flight control device 20 and/or any other flight control user interfaces in a desired direction away from an envelope protection limit and back toward acceptable flight parameters. The servo actuators 22 may be connected with the control device 20 at any point along various mechanical connections extending between the control surfaces and the control device 20. The servo actuators 22 may provide electrical, hydraulic, pneumatic, magnetic or any other means to generate a mechanical force. The force may be transmitted to the control device 20 through means of cables, pushrods, gears, belts, magnetic fields, or other means known in the art for transmitting forces. One or more of the servo actuators 22 may be variable such that the servo 22 may ramp up to its full force, or any intermediate variable force, over a period of time and ramp down to zero force over a period of time, instead of simply turning on and turning off. So, for example, if the banking angle is greater than an envelope protection start bank angle, the servo actuator 22 may ramp up to full force over a period of one second, and may similarly ramp down once the aircraft 12 has reached an envelope protection end bank angle. However, in various embodiments of the invention, the servo actuator 22 may simply disengage once the end value is reached without "ramping down" to zero force. The actuator 22 may also limit and modulate its maximum force as required to accommodate pilot feel.

Each servo actuator 22 may be operable to calculate its own envelope protection on/off status and drive command. When any of the servo actuators 22 engage in envelope protection mode, the servo actuator 22 may log an "event" in a fault log and/or a database in the memory 24 indicating when the servo actuator 22 turned on and when the servo actuator 22 turned off. In some embodiments, each servo actuator 22 may apply a variable force and/or a variable force rate based on one or more of banking angle, pitch attitude, g loading, proximity to at least one of terrain and obstacles, airspeed of the aircraft, and/or any other flight parameter. Thus, based on a sensed flight parameter and corresponding acceptable flight parameter limit, the system 10 and/or servo actuator 22 may determine an appropriate force and/or force rate to apply to the flight control device 20 that is less than or equal to the full force and/or full force rate capable of being provided by the servo actuator 22.

In use, the avionics system 10 monitors the status of the aircraft 12 to determine when envelope protection is available, when envelope protection should be engaged, and when envelope protection should be disengaged. For example, the avionics system 10 may determine that envelope protection is available if all of the following are true or if a select combination of the following are true: autopilot is available; autopilot is not engaged; avionics system 10 is operating in a dual attitude heading and reference system (AHRS) mode and in a dual air data computer (ADC) mode; the aircraft 12 is within autopilot engage limits; the CWS button and the AP DISC button are not pushed; a stall warning is not activated; the aircraft 12 has a valid height above ground according to a GPS/database terrain height, and the height above ground is greater than 100 feet. So, for example, in one embodiment, if the autopilot system 16 is engaged, envelope protection is not available and may not be activated.

Additionally, as stated above, the avionics system 10 may determine if envelope protection should be engaged. For example, envelope protection may be engaged if any of the following are true: bank angle is greater than an envelope protection start bank angle; pitch attitude is higher than a start maximum pitch attitude; pitch attitude is less than a start minimum pitch attitude; airspeed is greater than a start maximum airspeed; airspeed is less than a start minimum airspeed (note that each flap may have separate minimum start airspeeds for each flap setting); mach number is greater than start maximum Mach number; G loading is greater than the start maximum g limit; G loading is less than the start minimum g limit, combinations thereof, etc.

Alternatively, pitch criteria may be replaced by the following. For maximum pitch value, the avionics system 10 and/or computing device 14 may determine a pitch attitude required to capture and hold a minimum airspeed, a pitch attitude required to maintain a minimum g loading, a pitch attitude required to maintain a minimum angle of attack, and a maximum pitch attitude stored in memory for the specific aircraft. Then the avionics system 10 and/or the computing device 14 may use the lowest of these four pitch attitudes as the start maximum pitch attitude to determine if envelope protection should be engaged. Similarly, for a minimum pitch value, the avionics system 10 and/or computing device 14 may determine a pitch attitude required to capture and hold a maximum airspeed, a pitch attitude required to maintain a maximum g loading, and a minimum pitch attitude stored in memory 24 for a specific aircraft. Then the avionics system 10 and/or the computing device 14 may use the highest of these three pitch attitudes as the start minimum pitch attitude to determine if envelope protection should be engaged.

An envelope protection start bank angle may be calculated by the avionics system 10 and/or the computing device 14 as a function of speed.

When an airspeed rate and airspeed are such that the aircraft will be below a minimum airspeed in a short amount of time, such as five seconds, a warning such as an audible or visual warning may be provided to the pilot.

When the avionics system 10 determines that envelope protection is available and should be engaged, then the avionics system 10 and/or the computing device 14 may send a signal to the appropriate servo actuator 22 to provide force in a desired direction. Specifically, the servo actuator 22 may provide a force to the control device 20 when a start value is reached for a given parameter, and may continue to provide the force to the control device 20 until an end value is reached for the given parameter. For example, if a banking limit or banking start value is 47-degrees, once the aircraft 12 reaches a banking angle of 47-degrees, the servo actuator 22 may turn on and may ramp up to full torque over a short period of time, such as 1 second, pushing in a direction back toward a bank angle of zero degrees. The servo actuator 22 may ramp back down over a short period of time, such as 1 second, once an end value, for example 32-degrees, is reached. However, any start value or end value may be used. In various embodiments of the invention, the start value and the end value may be equal. Additionally, ramp up and/or ramp down time for the servo actuator may be set by the pilot or a flight parameter and one or both of ramp up and ramp down times may be zero.

In some cases, the pilot may continue to provide force to the control device 20 in a direction away from acceptable flight parameter limits. In this situation, if the pilot provides sufficient opposing force for a particular period of time, the servo 22 may be operable to disengage, allowing the pilot to override the envelope protection. Additionally, if the pilot moves the control device 20 in a desired, correct direction toward the end value at a rate faster than the servo actuator 22, then the servo actuator 22, sensing this force, may disconnect and allow the pilot to bring the aircraft 12 to the corresponding end value. The force, time, and/or rate sufficient to disengage the servo actuator 22 may be programmed into the computing device 14 or entered by the pilot via the user interface 28. Engagement of envelope protection for a specific period of time may also trigger autopilot mode(s) to engage or change the characteristics of the envelope protection forces and end values. Further, the force characteristics of one or more of the servo actuators 22 may be modified by the system 10 if the airspeed or another flight parameter falls below a predetermined minimum limit to alert the pilot. Thus, for example, one of the servo actuators 22 may engage to shake or vibrate the flight control device 20 to command pilot attention for corrective action.

Because airspeed of the aircraft may be corrected by pulling the nose of the aircraft 12 up to slow the aircraft 12 down or pushing the nose down to increase the speed of the aircraft 12, it is foreseeable that some cases may arise in which commands for correcting pitch and airspeed may conflict. For example, if the airspeed is too high (exceeds start maximum airspeed), the servo actuator 22 would typically respond by providing force in a direction to point the nose upward. However, when the aircraft's pitch is too high (exceeds start maximum pitch), the servo actuator 22 would typically respond by providing force in a direction to point the nose downward. If both the start value for maximum airspeed and the start value for maximum pitch are exceeded simultaneously, the avionics system 10 will prioritize the servo actuator 22 force to provide the appropriate aircraft motion. So in the case of both maximum airspeed and maximum pitch being exceeded, airspeed is corrected. Additionally, if the pitch of the aircraft is less than the start value for minimum pitch and the airspeed is lower than the start value for minimum airspeed, then the airspeed is corrected.

In one embodiment, if a stall speed minimum is reached (typically requiring the nose to push down to increase the speed), but the aircraft is a pre-set height too close to the ground, the avionics system 10 may change the characteristic of the force to attract the pilot's attention and prompt correct pilot action. For example, the servo actuator 22 may be on for 0.5 seconds and then off for 0.5 seconds. Such a configuration can provide enough average nose-down force to avert the negative consequences of falling below the aircraft's stall speed minimum.

Start and end values for envelope protection may be set by the pilot via the user interface 28 or can be determined by the avionics system 10 depending on the type of aircraft, configuration of the aircraft, feedback from the sensors, etc. Additionally, the pilot may push a button to disengage or interrupt envelope protection, such as the CWS or AP DISC buttons. When envelope protection is active, meaning the servo actuator 22 is providing a correcting force to the control device 20, the aircraft's auto trim may not run, manual electric trim may not run, and operation of manual electric trim may not disengage the servo actuators.

Additionally, each configuration of the aircraft, such as flap setting, landing gear position, slats configuration, etc. may have a separate minimum start airspeed for each configuration.

If the avionics system 10 detects that the pilot has given up control of the aircraft 12, then the autopilot system 16 may be activated. It may be determined that the pilot has given up control of the aircraft 12 if no force has been applied by the pilot to the control device 20 for a predetermined amount of time or the envelope protection has remained engaged for a particular percentage of time within a predetermined length of time.

The display 26 may also present an indication of the availability of envelope protection. For example, the display 26, or other portions of the user interface 28, may present a visual or audible indication to alert the pilot to the availability of envelope protection. In some embodiments, the indication of the availability of envelope protection provided by the system 10 may be independent of the ability to actually engage envelope protection. Thus, the system 10 may indicate the availability of envelope protection to the pilot even when envelope protection may not actually engage. For example, the system 10 may present an icon on the display 26 to indicate the availability of envelope protection (i.e. the envelope protection system has not failed) even when the current altitude of the aircraft 12 would prohibit the engagement of envelope protection (because it is locked out below a certain altitude).

Although embodiments of the invention have been described with reference to the embodiments illustrated in the attached drawings, it is noted that equivalents may be employed and substitutions made herein without departing from the scope of the invention as recited in the claims.

Having thus described various embodiments of the invention, what is claimed as new and desired to be protected by Letters Patent includes the following:

1. An avionics system for a mechanically-controlled aircraft having a flight control device, the avionics system configured to provide envelope protection for deterring a pilot from flying outside of acceptable flight parameter limits, the avionics system comprising:
   at least one servo actuator connected with the flight control device of the aircraft such that the servo actuator provides force to the flight control device when engaged;
   a computing device configured to—
   receive flight parameters from one or more sensors, and
   engage envelope protection by engaging the at least one servo actuator if one or more of the flight parameters received reach or exceed any of the acceptable flight parameter limits, such that the at least one servo actuator provides a force to urge the flight control device in a direction to bring the aircraft back within the acceptable flight parameter limits; and
   an autopilot system communicably connected or integral with the computing device, such that availability of envelope protection is dependent on the status of the autopilot system.

2. The avionics system of claim 1, wherein the at least one servo actuator gradually ramps up to a full force when engaged.

3. The avionics system of claim 1, wherein the computing device is configured to disengage the at least one servo actuator if a force is provided by the pilot to the flight control device for a predetermined length of time in a direction opposite of the force provided by the servo actuator.

4. The avionics system of claim 1, wherein the computing device is further configured to disengage the at least one servo actuator once at least one of the flight parameters reaches an end value that is within the acceptable flight parameter limits.

5. The avionics system of claim 4, wherein the computing device is configured to disengage the at least one servo actuator prior to the aircraft reaching the start value if the control device is being moved toward the start value by the pilot at a faster rate than the servo actuator for a predetermined length of time.

6. The avionics system of claim 1, wherein the flight parameters comprise banking angles, pitch attitude, g loading, proximity to terrain or obstacles, angle of attack, or airspeed.

7. The avionics system of claim 6, wherein the computing device is configured to instruct the at least one servo actuator to urge the control device in a direction toward acceptable airspeed limits if both pitch attitude and airspeed are outside of acceptable flight parameter limits.

8. The avionics system of claim 6, wherein the computing device is configured to change a force characteristic of the servo actuator if the airspeed falls below a predetermined minimum limit to alert the pilot.

9. The avionics system of claim 1, wherein the autopilot is configured to engage if the pilot has applied no force to the control device for a predetermined amount of time or the envelope protection has remained engaged for a particular percentage of time within a predetermined length of time.

10. An avionics system for a mechanically-controlled aircraft having a flight control device, the avionics system configured to provide envelope protection for deterring a pilot from flying outside of acceptable flight parameter limits for any one of banking angle, pitch attitude, g loading, proximity to at least one of terrain and obstacles, angle of attack, and airspeed, the avionics system comprising:
   at least one servo actuator connected with the flight control device of the aircraft such that the servo actuator provides force to the flight control device when engaged; and
   a computing device configured to:
   receive data from one or more sensors regarding any of banking angle, pitch attitude, g loading, proximity to at least one of terrain and obstacles, and airspeed of the aircraft, and
   engage envelope protection by engaging the at least one servo actuator if any of the banking angle, pitch attitude, g loading, proximity to at least one of terrain and obstacles, angle of attack and airspeed reach or exceed their corresponding acceptable flight parameter limits, such that the at least one servo actuator provides a force to urge the flight control device in a direction to bring the aircraft back within the acceptable flight parameter limits;
   wherein the computing device stores or calculates a maximum and a minimum start value and a maximum and a minimum end value for any of banking angle, pitch attitude, g loading, proximity to at least one of terrain and obstacles, angle of attack, and airspeed, wherein the maximum and minimum start values are equal to the acceptable flight parameter limits and the corresponding maximum and minimum end values are between maximum and minimum acceptable flight parameter limits, such that the at least one servo actuator is engaged when any of the start values are reached and is disengaged when the corresponding end value is reached.

11. An avionics system for a mechanically-controlled aircraft having a flight control device, the avionics system configured to provide envelope protection for deterring a pilot from flying outside of acceptable flight parameter limits for any one of banking angle, pitch attitude, g loading, proximity to at least one of terrain and obstacles, angle of attack, and airspeed, the avionics system comprising:
at least one servo actuator connected with the flight control device of the aircraft such that the servo actuator provides force to the flight control device when engaged; and
a computing device configured to:
receive data from one or more sensors regarding any of banking angle, pitch attitude, g loading, proximity to at least one of terrain and obstacles, and airspeed of the aircraft, and
engage envelope protection by engaging the at least one servo actuator if any of the banking angle, pitch attitude, g loading, proximity to at least one of terrain and obstacles, angle of attack and airspeed reach or exceed their corresponding acceptable flight parameter limits, such that the at least one servo actuator provides a force to urge the flight control device in a direction to bring the aircraft back within the acceptable flight parameter limits;
wherein the at least one servo actuator gradually ramps up to a full force when engaged.

12. The avionics system of claim 11, wherein the at least one servo actuator applies a variable force based on one or more of the banking angle, pitch attitude, g loading, proximity to at least one of terrain and obstacles, and airspeed of the aircraft.

13. The avionics system of claim 11, wherein the computing device is configured to instruct the at least one servo actuator to urge the control device in a direction toward acceptable airspeed limits if both pitch attitude and airspeed are outside of the acceptable flight parameter limits.

14. An avionics system for a mechanically-controlled aircraft having a flight control device, the avionics system configured to provide envelope protection for deterring a pilot from flying outside of acceptable flight parameter limits for any one of banking angle, pitch attitude, g loading, proximity to at least one of terrain and obstacles, angle of attack, and airspeed, the avionics system comprising:
at least one servo actuator connected with the flight control device of the aircraft such that the servo actuator provides force to the flight control device when engaged; and
a computing device configured to:
receive data from one or more sensors regarding any of banking angle, pitch attitude, g loading, proximity to at least one of terrain and obstacles, and airspeed of the aircraft, and
engage envelope protection by engaging the at least one servo actuator if any of the banking angle, pitch attitude, g loading, proximity to at least one of terrain and obstacles, angle of attack and airspeed reach or exceed their corresponding acceptable flight parameter limits, such that the at least one servo actuator provides a force to urge the flight control device in a direction to bring the aircraft back within the acceptable flight parameter limits;
wherein the computing device is configured to disengage the at least one servo actuator if a sufficient force is provided by the pilot to the control device for a sufficient length of time in a direction opposite of the force provided by the servo actuator.

15. An avionics system for a mechanically-controlled aircraft having a flight control device, the avionics system configured to provide envelope protection for deterring a pilot from flying outside of acceptable flight parameter limits for any one of banking angle, pitch attitude, g loading, proximity to at least one of terrain and obstacles, angle of attack, and airspeed, the avionics system comprising:
at least one servo actuator connected with the flight control device of the aircraft such that the servo actuator provides force to the flight control device when engaged; and
a computing device configured to:
receive data from one or more sensors regarding any of banking angle, pitch attitude, g loading, proximity to at least one of terrain and obstacles, and airspeed of the aircraft, and
engage envelope protection by engaging the at least one servo actuator if any of the banking angle, pitch attitude, g loading, proximity to at least one of terrain and obstacles, angle of attack and airspeed reach or exceed their corresponding acceptable flight parameter limits, such that the at least one servo actuator provides a force to urge the flight control device in a direction to bring the aircraft back within the acceptable flight parameter limits;
wherein the computing device is configured to disengage the at least one servo actuator if the control device is being moved toward a desired end value by the pilot at a faster rate than the servo actuator for a certain length of time.

16. The avionics system of claim 11, wherein the computing device is configured to change a force characteristic of the servo actuator if the airspeed falls below a predetermined minimum limit to alert the pilot.

17. An avionics system for a mechanically-controlled aircraft having a flight control device, the avionics system configured to provide envelope protection for deterring a pilot from flying outside of acceptable flight parameter limits for any one of banking angle, pitch attitude, g loading, proximity to at least one of terrain and obstacles, angle of attack, and airspeed, the avionics system comprising:
at least one servo actuator connected with the flight control device of the aircraft such that the servo actuator provides force to the flight control device when engaged; and
a computing device configured to:
receive data from one or more sensors regarding any of banking angle, pitch attitude, g loading, proximity to at least one of terrain and obstacles, and airspeed of the aircraft, and
engage envelope protection by engaging the at least one servo actuator if any of the banking angle, pitch attitude, g loading, proximity to at least one of terrain and obstacles, angle of attack and airspeed reach or exceed their corresponding acceptable flight parameter limits, such that the at least one servo actuator provides a force to urge the flight control device in a direction to bring the aircraft back within the acceptable flight parameter limits; and
an autopilot system communicably connected or integral with the computing device, such that availability of envelope protection is dependent on the status of the autopilot system, wherein the autopilot is configured to engage if the pilot has applied no force to the control device for a predetermined amount of time or the envelope protection has remained engaged for a particular percentage of time within a predetermined length of time.

18. An avionics system for a mechanically-controlled aircraft having a flight control device, the avionics system configured to provide envelope protection for deterring a pilot from flying outside of acceptable flight parameter limits for any of banking angle, pitch attitude, g loading, proximity to at least one of terrain and obstacles, angle of attack, and airspeed, the avionics system comprising:

at least one servo actuator connected with the flight control device of the aircraft such that the servo actuator provides force to the flight control device when engaged, wherein the at least one servo actuator is operable to gradually ramp up to a full torque when engaged;

a computing device having a memory and configured to:
receive data from one or more sensors regarding any of banking angle, pitch attitude, g loading, proximity to at least one of terrain and obstacles, angle of attack, and airspeed readings of the aircraft, store or calculate a maximum and a minimum start value and a maximum and a minimum end value for any of pitch angle, pitch attitude, g loading, proximity to at least one of terrain and obstacles, angle of attack, and airspeed, wherein the maximum and minimum start values are equal to the acceptable flight parameter limits and the corresponding maximum and minimum end values are between maximum and minimum acceptable flight parameter limits, engage envelope protection by engaging the at least one servo actuator if the maximum or minimum start value for any of the banking angle, pitch attitude, g loading, proximity to at least one of terrain and obstacles, angle of attack, and airspeed are reached or exceeded, such that the at least one servo actuator provides a force to urge the flight control device in a direction to bring the aircraft back within the acceptable flight parameter limits, and disengage envelope protection by disengaging the at least one servo actuator if the aircraft reaches the end value corresponding to the start value that triggered envelope protection to engage; and an autopilot system communicably connected or integral with the computing device, such that envelope protection is operable to be engaged only when autopilot is available but not engaged.

19. The avionics system of claim 18, wherein a maximum start pitch at which envelope protection is engaged is the lowest of:
a calculated pitch attitude required to capture and hold a minimum airspeed,
a calculated pitch attitude required to maintain a minimum g loading,
a calculated pitch attitude required to maintain a minimum angle of attack, and
a maximum pitch attitude stored in the memory of the computing device.

20. The avionics system of claim 18, wherein a minimum start pitch at which envelope protection is engaged is the highest of:
a calculated pitch attitude required to capture and hold the maximum airspeed,
a calculated pitch attitude required to maintain a maximum g loading, and
a minimum pitch attitude stored in the memory of the computing device.

21. The avionics system of claim 18, further including a display coupled with the computing device, the display operable to present an indication of the availability of envelope protection, wherein the display of the availability of envelope protection is independent of the ability of the computing device to engage envelope protection.

* * * * *